United States Patent
Glawitsch (12) 
(10) Patent No.: US 6,772,334 B1
(45) Date of Patent: Aug. 3, 2004

(54) SYSTEM AND METHOD FOR PREVENTING A SPOOFED DENIAL OF SERVICE ATTACK IN A NETWORKED COMPUTING ENVIRONMENT

(75) Inventor: Gregor A. Glawitsch, Milpitas, CA (US)

(73) Assignee: Networks Associates, Inc., Santa Clara, CA (US)

(*) Notice: Subject to any disclaimer, the term of this patent is extended or adjusted under 35 U.S.C. 154(b) by 887 days.

(21) Appl. No.: 09/655,459

(22) Filed: Aug. 31, 2000

(51) Int. Cl.$^7$ ................................................. H04L 9/00
(52) U.S. Cl. ..................................... 713/153; 713/201
(58) Field of Search ................................ 713/150, 153, 713/200, 201

(56) References Cited

U.S. PATENT DOCUMENTS

| | | | |
|---|---|---|---|
| 4,641,274 A | * 2/1987 | Swank | 715/531 |
| 5,070,528 A | * 12/1991 | Hawe et al. | 713/161 |
| 5,325,370 A | * 6/1994 | Cleveland et al. | 714/755 |
| 5,511,122 A | * 4/1996 | Atkinson | 713/153 |
| 5,941,998 A | * 8/1999 | Tillson | 714/54 |
| 5,950,195 A | * 9/1999 | Stockwell et al. | 707/4 |
| 6,070,243 A | * 5/2000 | See et al. | 713/201 |
| 6,092,191 A | * 7/2000 | Shimbo et al. | 713/153 |
| 6,144,744 A | * 11/2000 | Smith et al. | 380/45 |

OTHER PUBLICATIONS

S. Bellovin, 1996, AT&T Research, "Defending Against Sequence Number Attacks".*
Bruce Schneier, 1996, Katherine Schowalter, "Applied Cryptography", 445,455.*
W. Richard Stevens, 1994, Addison Wesley, "TCP/IP Illustrated, vol. 1", 34, 225.*

* cited by examiner

*Primary Examiner*—Gregory Morse
*Assistant Examiner*—Jon Adams
(74) *Attorney, Agent, or Firm*—Patrick J.S. Inouye; Christopher J. Hamaty (57) ABSTRACT

A system and a method for preventing a spoofed denial of service attack in a networked computing environment is described. A hierarchical protocol stack is defined. The hierarchical protocol stack includes a plurality of communicatively interfaced protocol layers with at least one session-oriented protocol layer. A packet requesting a session with the session-oriented protocol layer is received from the networked computing environment. The request packet includes headers containing a source address of uncertain trustworthiness. The request packet is acknowledged by performing the following operations. First, a checksum is calculated from information included in the request packet headers. A request acknowledgement packet is generated. The request acknowledgement packet includes headers containing the checksum as a pseudo sequence number and the source address in the request packet headers as a destination address. Finally, the request acknowledgement packet is sent into the networked computing environment. An acknowledgement packet is received from the networked computing environment. The acknowledgement packet includes headers containing an acknowledgement number. The acknowledgement packet is validated by performing the following operations. First, a validation checksum is calculated from information included in the acknowledgement packet headers. Then, the validation checksum is compared to the acknowledgement number of the acknowledgement packet. No state is maintained by the authenticating system until the comparison has succeeded.

20 Claims, 9 Drawing Sheets

SYSTEM AND METHOD FOR PREVENTING A SPOOFED DENIAL OF SERVICE ATTACK IN A NETWORKED COMPUTING ENVIRONMENT

CROSS-REFERENCE TO RELATED APPLICATION

This patent application is related to commonly-assigned U.S. patent application Ser. No. 09/655,515, entitled "Apparatus And Method For Controlling Access To Network Resources Through Stateless Client Validity Checking," filed Aug. 31, 2000, pending, the disclosure of which is incorporated herein by reference.

FILED OF THE INVENTION

The present invention relates in general to networked computing environment protection, and, in particular, to a system and method for preventing a spoofed denial of service attack in a networked computing environment.

BACKGROUND OF THE INVENTION

Computer networks form a central component of corporate information technology infrastructures. There are two types of networks. A local area network or "intranetwork" is a network operating within a single identifiable location, such as on one floor of a building. Individual computers and shared resources are interconnected over a single media segment. A wide area network or "internetwork" is a network consisting of interconnected intranetworks and geographically computational resources which, when taken as a whole, comprise a unified set of loosely associated computers. The Internet, for example, is a public internetwork interconnecting clients worldwide.

Structurally, most internetworks and intranetworks are based on a layered network model employing a stack of standardized protocol layers. The Transmission Control Protocol/Internet Protocol (TCP/IP) suite, such as described in W. R. Stevens, "TCP/IP Illustrated," Vol. 1, Ch. 1 et seq., Addison-Wesley (1994), the disclosure of which is incorporated herein by reference, is a widely adopted network model. Computers and network resources using the TCP/IP suite implement hierarchical protocol stack that include link, network and transport layers. In addition, client and server end devices implement an application layer for providing or receiving services, such as electronic mail, content provision or resource sharing, to individual clients. The Transmission Control Protocol (TCP) provides a connection-oriented, reliable, byte stream service. Services offered in a TCP environment are session-based and TCP sessions must be initiated through a negotiated three-way handshaking sequence.

TCP-based networks are particularly susceptible to a type of attack known as a denial of service ("DoS") attack. Ordinarily, a TCP server will reserve state, such as memory buffers, upon receiving a service request from a client in the expectation of having to process transient data packets during a session. However, a state consumption attack attempts to force a victim server to allocate state for unproductive uses during the three-way handshaking sequence. In a DoS attack, an attacker will cause a high volume of bogus service requests to be sent to a victim server which will continue to allocate state until all available state is expended. Thus, no state will be left for valid requesters and service will be denied. In addition, DoS attacks are difficult to detect because the bogus service requests are indistinguishable from normal network traffic.

One form of DoS attack employs "spoofed" packet source addresses. A spoofed packet is a data packet sent by a third party containing a source address other than the source address of that third party. The fraudulent source address could be the address of another system or might be a random source address that is valid yet not presently in use. Unfortunately, TCP does not provide means for ensuring that packet source addresses are not fraudulent. Attackers take advantage of this security hole by sending service request packets with fraudulent source addresses to disguise their identity. Consequently, tracing the source of spoofed DoS attacks is often meaningless and the attackers are virtually untraceable.

In the prior art, firewalls have traditionally provided a first line of defense against all types of attacks. Firewalls are placed at the boundary separating an intranetwork from a public internetwork and prevent network compromise by unauthorized users through packet filtering and proxies. However, firewalls fail to provide an adequate defense to DoS attacks for several reasons.

For instance, most firewalls filter packets by comparing the source addresses of incoming packets to lists of individual addresses and address ranges. However, these addresses and address ranges must be periodically loaded into the firewall. Loading this information once a DoS attack is underway is too late to be of practical use. Similarly, address range checking can be too restrictive and can filter out valid yet not presently connected addresses.

More importantly, though, most, if not all, of the packets used to produce a DoS attack will appear valid, as there is no a priori method to sort spoofed packets from non-spoofed packets. As well, application layer firewalls, such as might be incorporated directly into a server, risk running out of state at the TCP and IP protocol layers in the same manner as the underlying servers which they are attempting to protect. Finally, firewalls are typically installed within the infrastructure of an organization in front of the internal machine population, thereby providing no further protection beyond the protected machine boundary.

Therefore, there is a need for a solution providing protection against DoS attacks in a TCP-based computing environment. Preferably, such an approach would operate in a stateless fashion to protect the firewall from allocating state and thus ensure that the firewall would not run out of resources during a DoS. Moreover, such an approach would operate at a network layer in a protocol-independent manner.

There is a further need for a dynamic approach to packet validity checking which can detect spoofed, fictitious, and inactive addresses. Preferably, such an approach would validate all source addresses in an unintrusive manner.

SUMMARY OF THE INVENTION

The present invention provides a system and method for protecting against state consumption-type DoS attacks. Typically, DoS attacks can occur in TCP-based networked computing environments. A system, such as could be incorporated into a firewall, intercepts session request packets. A checksum, preferably cryptographic, is generated from information contained in the headers of each request packet. An request acknowledgement packet is sent to the source address indicated in the request packet headers with the checksum included as a pseudo sequence number. If an acknowledgement packet is received back, a second checksum is generated from information contained in the headers of the acknowledgement packet. The second checksum is compared to the acknowledgement number contained in the acknowledgement packet headers. If the checksum and acknowledgement number match, the session request is valid and a handshaking sequence is performed with the server. The sequence numbers of subsequent session packets are translated to account for the pseudo acknowledgement number.

An embodiment of the present invention is a system and a method for preventing a spoofed denial of service attack in a networked computing environment. A hierarchical protocol stack is defined. The hierarchical protocol stack includes a plurality of communicatively interfaced protocol layers with at least one session-oriented protocol layer. A packet requesting a session with the session-oriented protocol layer is received from the networked computing environment. The request packet includes headers containing a source address of uncertain trustworthiness. The request packet is acknowledged by performing the following operations. First, a checksum is calculated from information included in the request packet headers. A request acknowledgement packet is generated. The request acknowledgement packet includes headers containing the checksum as a pseudo sequence number and the source address in the request packet headers as a destination address. Finally, the request acknowledgement packet is sent into the networked computing environment. An acknowledgement packet is received from the networked computing environment. The acknowledgement packet includes headers containing an acknowledgement number. The acknowledgement packet is validated by performing the following operations. First, a validation checksum is calculated from information included in the acknowledgement packet headers. Then, the validation checksum is compared to the acknowledgement number. No state is maintained by the authenticating system until the comparison has succeeded.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
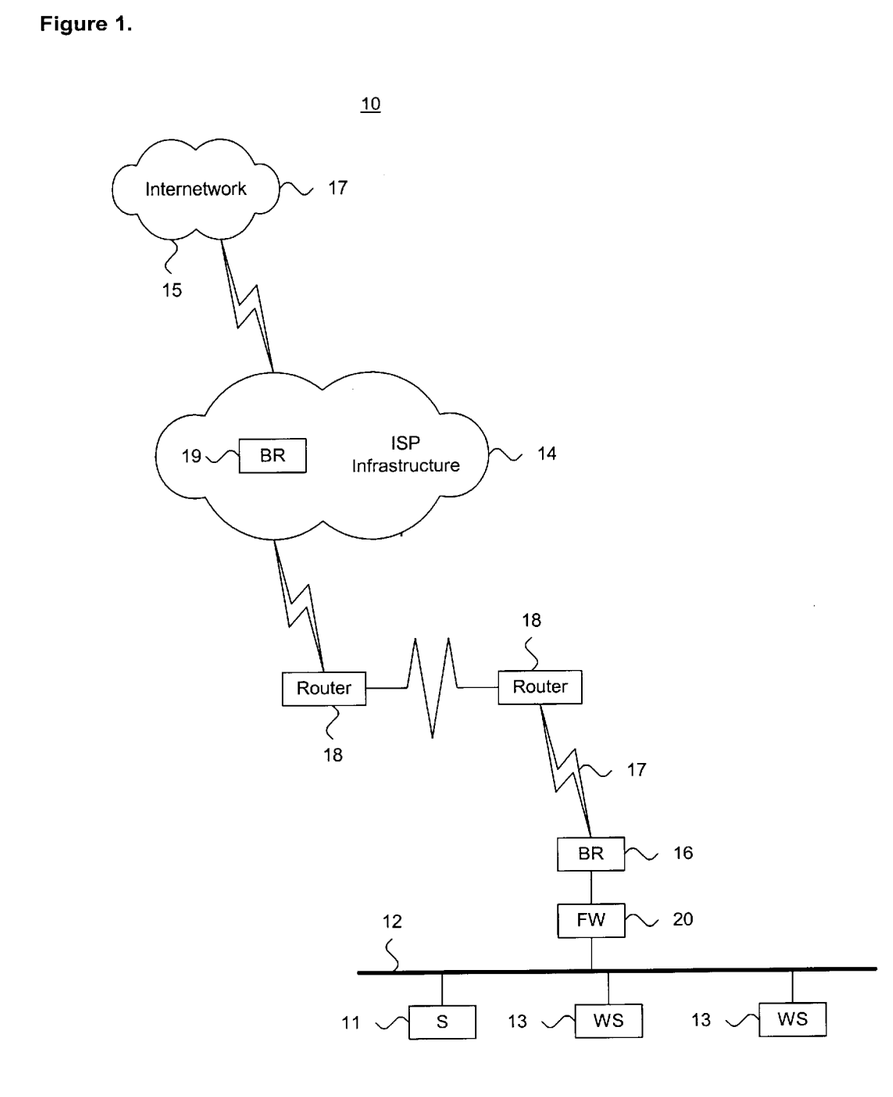
FIG. 1 is a block diagram showing a networked computing environment, including a system for preventing a spoofed denial of service attack, in accordance with the present invention.

FIG. 1 is a block diagram showing a networked computing environment 10, including a system, incorporated into a firewall 20 (FW), for preventing a spoofed denial of service attack, in accordance with the present invention. The environment 10 includes a intranetwork 12 interconnected with an internetwork 15, such as the Internet, by means of an Internetwork Service Provider (ISP) infrastructure 14. The intranetwork 12 includes a local server 11 (S) with a plurality of workstations (WS) 13 and similar network resources. Internally, the ISP infrastructure 14 includes a plurality of network service support machines, include high bandwidth routers, servers, and related support equipment, as is known in the art.

The intranetwork 12 interfaces to the internetwork 15 through a series of high- and low-bandwidth connections. A high-bandwidth connection 17, such as an optical carrier OC-3 (155.52 Mbps) or OC-12 (622.08 Mbps) line, connects the intranetwork 12 to a pair of routers 18 which exchange data over low-bandwidth commercial lines. The intranetwork 12 interfaces to the high-bandwidth connection 17 through a border router 16 (BR) or similar device. Similarly, the ISP infrastructure 14 interfaces to the router 18 over a high-bandwidth connection 17 through a border router 19.

Figure 2:
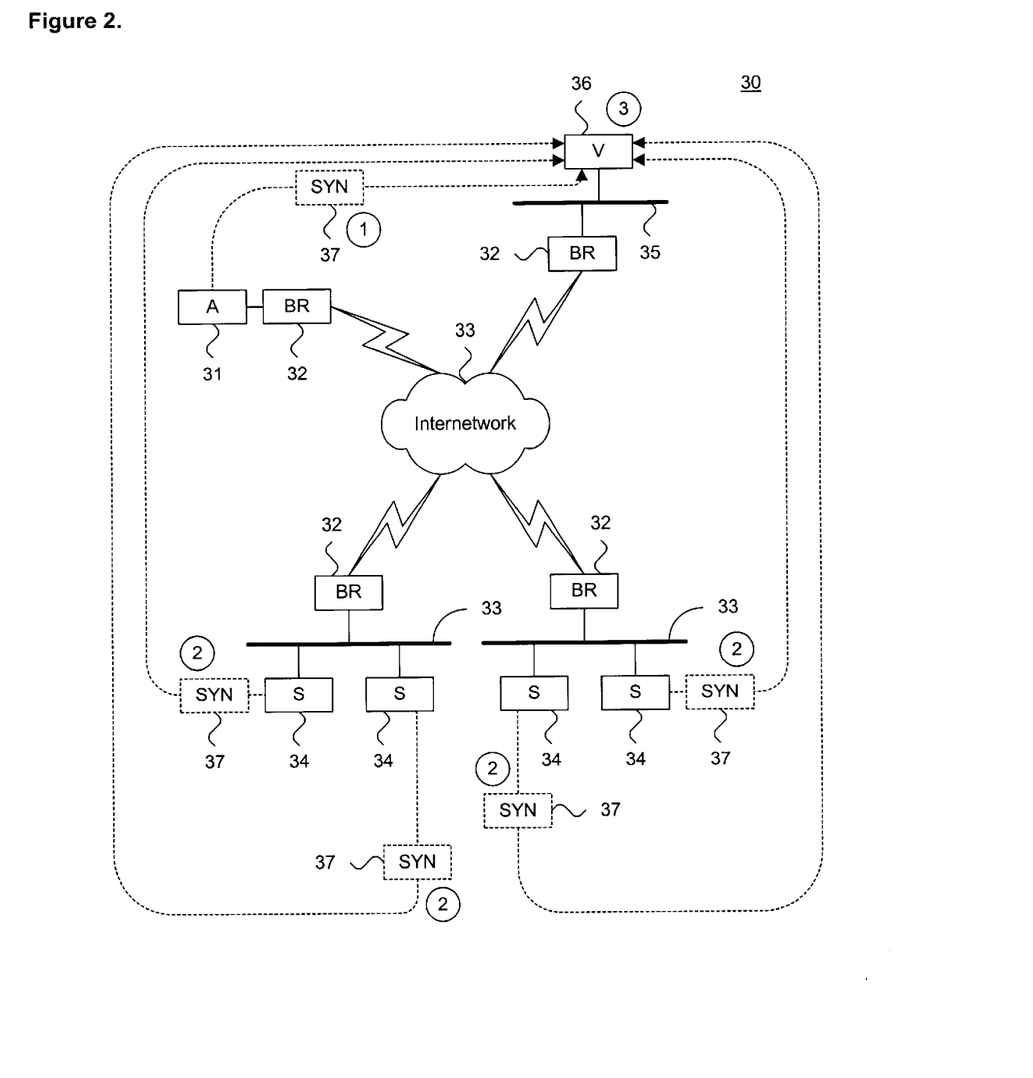
FIG. 2 is a network diagram illustrating, by way of example, the progression of a state consumption attack.

The server 11 is susceptible to denial of service (DoS) attacks, particularly state consumption attacks, as further described below with respect to FIG. 2. As protection against DoS attacks, firewall 20 can be placed at between the border router 16 and the intranetwork 12. The firewall 20 incorporates a system for preventing a spoofed denial of service attack, as further described below beginning with reference to FIG. 4.

The individual computer systems 11 and 13 are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

State consumption attacks are a specific type of DoS attack that can cripple or disable network servers 11 through bogus session requests. FIG. 2 is a network diagram 30 illustrating, by way of example, the progression of a state consumption attack. The goal of a state consumption attack is to induce a victim server 36 into allocating state, such as memory buffers and similar limited resources, through incomplete service requests. State consumption attacks occur in TCP/IP compliant computing environments with connection-oriented protocols, such as TCP.

Although several forms of state consumption attacks exist, the SYN attack is the most notorious. This type of attack relies upon inherent limitations in the TCP protocol. Ordinarily, when opening a new connection, a server 36 performs a three-way handshake sequence with a requesting client. The three-way handshake is further described in W.

R. Stevens, "TCP/IP Illustrated," Vol. 1, Ch. 18, Addison-Wesley (1994), the disclosure of which is incorporated herein by reference. Briefly, the handshake begins when a requesting client sends a synchronize (SYN) request to a server with which the client wishes to establish a connection. The server allocates state upon receipt of the SYN request and sends a SYN/acknowledgement (ACK) response back to the requesting client. The client then sends back an ACK to confirm and establish the connection.

A state consumption attack progresses as follows. A plurality of individual intranetworks 33, 35 are interconnected via an internetwork 33 using conventional low- and high-bandwidth carriers interfaced via border routers 32 or similar devices. Other network topologies and configurations are feasible. An attacker 31 sends a stream of SYN request packets 37 with a fraudulent, that is, "spoofed," source address to a victim server 36 (step ①). The attacker 31 might also induce a plurality of servers 34 to send fraudulent SYN request packets 37 (step ②), such as through broadcast messaging. In turn, the victim server 36 allocates state (step ③) and sends SYN/ACK response packets to the system indicated in the source address of each SYN request packet 37. However, since the source addresses are spoofed, no ACK packets are returned and the state on the victim server 36 remains allocated until each request times out. If a sufficient number of SYN request packets 37 are sent in rapid succession, all available state in the victim server 36 will be allocated in reliance on the fraudulent SYN request packets 37. Thus, no state will be available for valid requests and the service will be denied.

Unfortunately, the SYN request packets 37 used to attack victim servers 36 resemble valid, bona fide traffic. Consequently, DoS attacks are difficult to detect. Moreover, state consumption attacks can also target ISP infrastructures 14 (shown in FIG. 1) resulting in a wider impact.

Figure 3:
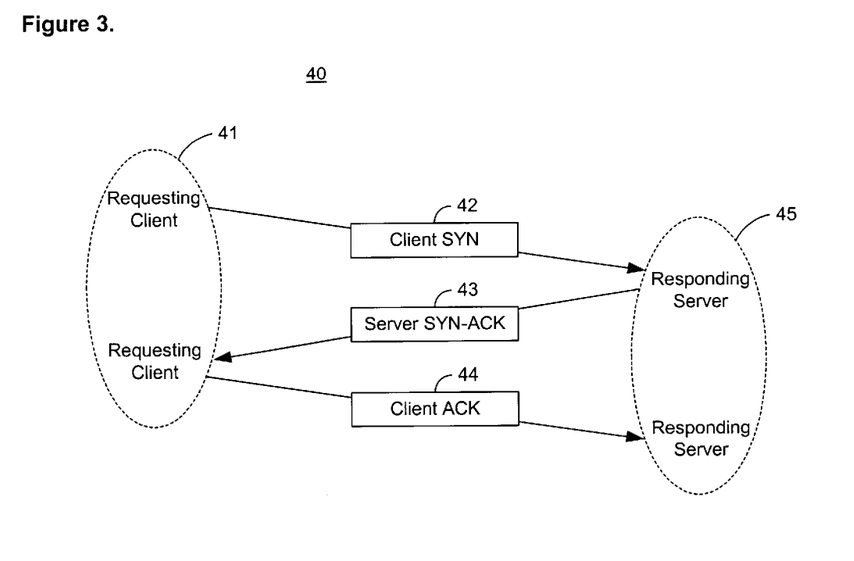
FIG. 3 is a timing diagram showing, by way of example, the three-way handshake performed during the initiation of a TCP session.

FIG. 3 is a timing diagram showing, by way of example, the three-way handshake 40 performed during the initiation of a TCP session. TCP is a connection-oriented, session-based protocol. Individual TCP sessions are end-to-end communications with a three-way handshake sequence 40 executed between peer TCP layers. Ordinarily, the handshake sequence 40 is transacted between a requesting client 41 and a responding server 45. Upon successful completion of the handshake sequence, session-based programs in the application layers of the client 41 and server 45 communicate by exchanging TCP packets.

The TCP three-way handshake consists of three exchanges, such as described in W. R. Stevens, "TCP/IP Illustrated," Vol. 1, Chs. 17–18, Addison-Wesley (1994), and Postel, J. B., "Transmission Control Protocol," RFC 793 (September 1981), the disclosures of which are incorporated herein by reference. First, an initiating client sends a synchronize (SYN) packet 42 to a server. The SYN packet 42 has an internet protocol (IP) header containing fields for storing a source address and destination address and a TCP header containing fields for storing a source port number, destination port number, and sequence number n. The sequence number n is a 32-bit unsigned integer chosen by the initiating client.

The server responds by sending a SYN-acknowledgement (ACK) packet 43 addressed to the system located at the source address. The SYN-ACK packet 43 also has an IP header containing fields for storing a source address and destination address and a TCP header containing fields for storing a source port number, destination port number, sequence number n, plus an acknowledgement number m. The acknowledgement number m is also a 32-bit unsigned integer. The client's sequence number n is incremented by one to indicate acknowledgement by the server and is sent back to the system located at the source address in the acknowledgement number m field. In addition, the server includes its own sequence number in the sequence number n field.

Assuming the source address is valid, the initiating client returns an ACK packet 44 with the TCP header containing the sequence number n chosen by the server incremented by one in the acknowledgement field to indicate acknowledgement by the client. Thus, upon successful completion of the three-way handshake, the sequence number n field of the ACK packet 44 contains the client sequence number plus one and the acknowledgement number m field contains the server sequence number plus one.

Figure 4:
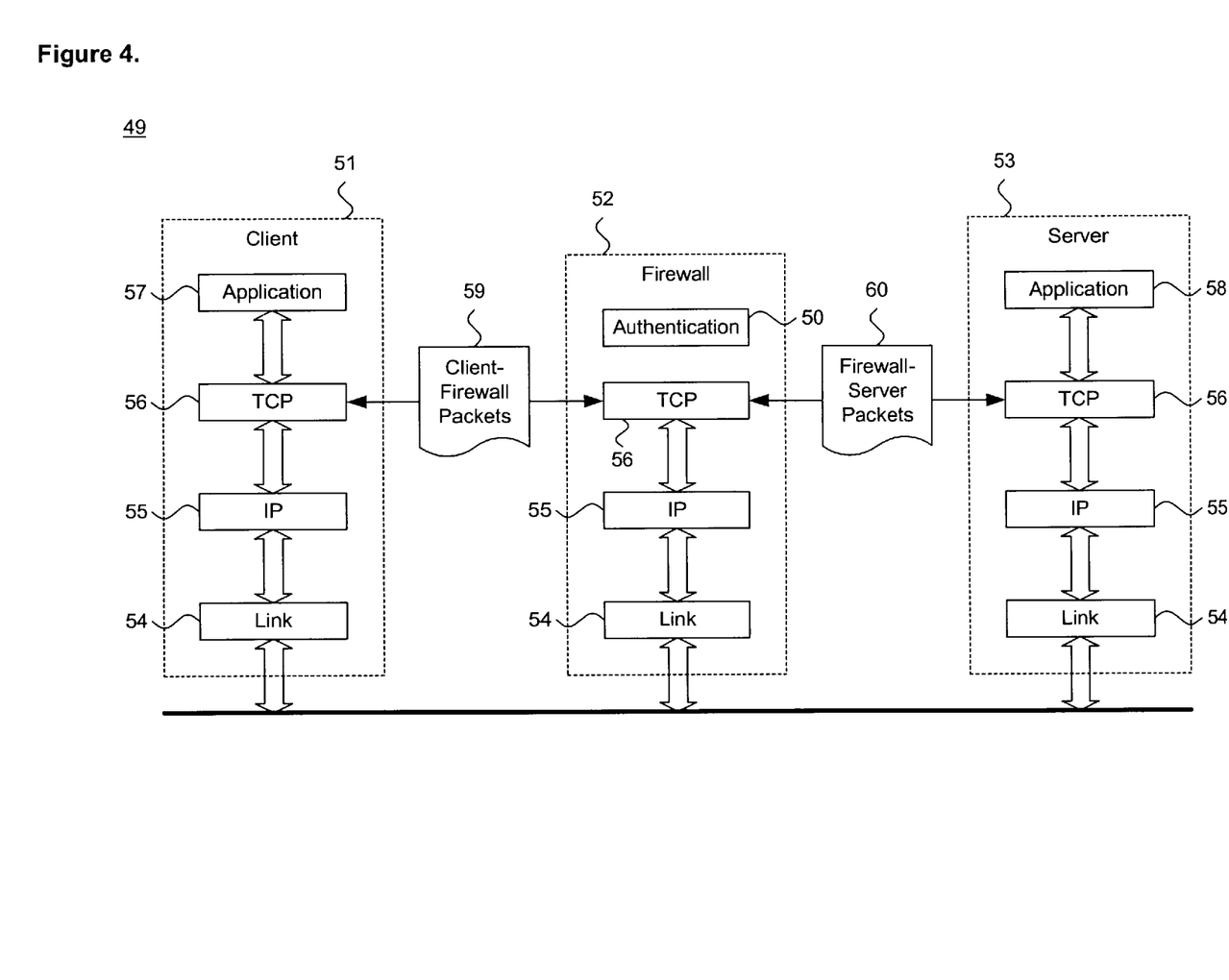
FIG. 4 is a block diagram showing an authentication system for preventing a spoofed denial of service attack for use in a networked computing environment.

FIG. 4 is a block diagram showing an authentication system 50, incorporated into firewall 52, for preventing a spoofed DoS attack for use in a networked computing environment 49. For the purpose of illustrating how to prevent spoofed DoS attacks, the networked computing environment 50 consists of three types of systems: a requesting client 51, a firewall 52, and a responding server 53. Each of these systems implement a TCP/IP network protocol stack which includes link 54, IP 55 and TCP 56, layers, such as described in W. R. Stevens, "TCP/IP Illustrated," Vol. 1, Ch. 1 et seq., Addison-Wesley (1994), the disclosure of which is incorporated herein by reference. In addition, both the client 51 and server 52 implement client application 57 and server application 58 layers. In the case of a DoS attack on the server 53, the client application 57 is actually a malicious application that attempts to consume the state in the TCP layer 56 of the server 53.

In the described embodiment, a firewall 52 intercedes between the client 51 and the server 53 and performs the handshake sequence to prevent DoS attacks, as further described below with reference to FIG. 5. The firewall 52 functions as a pseudo server by exchanging client-firewall packets 59 with the client 51 and firewall-server packets 60 with the server 53. A client-firewall handshake sequence is first attempted and, if authenticated, a firewall-server handshake sequence is then performed.

In the described embodiment, the authentication system 50 is incorporated in a firewall 52 operating on a programmed digital computer. As is conventional in the art, the firewall 52 operates under the control of an operating system, such as the Unix or Windows NT operating systems. An exemplary firewall 52 is the Gauntlet firewall product, version 5.5, licensed by Network Associates, Inc., Santa Clara, Calif. Alternatively, the authentication system 50 could be incorporated directly into a network protocol stack, such as a TCP/IP stack running on either a firewall, server, or client. As well, the authentication system 50 could be implemented as a stand-alone program or as a program module working in conjunction with an operating system, protocol stack, or other application, procedure, driver, or module. Finally, the authentication system 50 could be implemented entirely or partly in hardware, firmware, or software, as would be recognized by one skilled in the art. In particular, the translation module, discussed below with reference to FIG. 6, could be efficiently implemented in hardware to optimize the firewall-server sequence number conversions.

Figure 5:
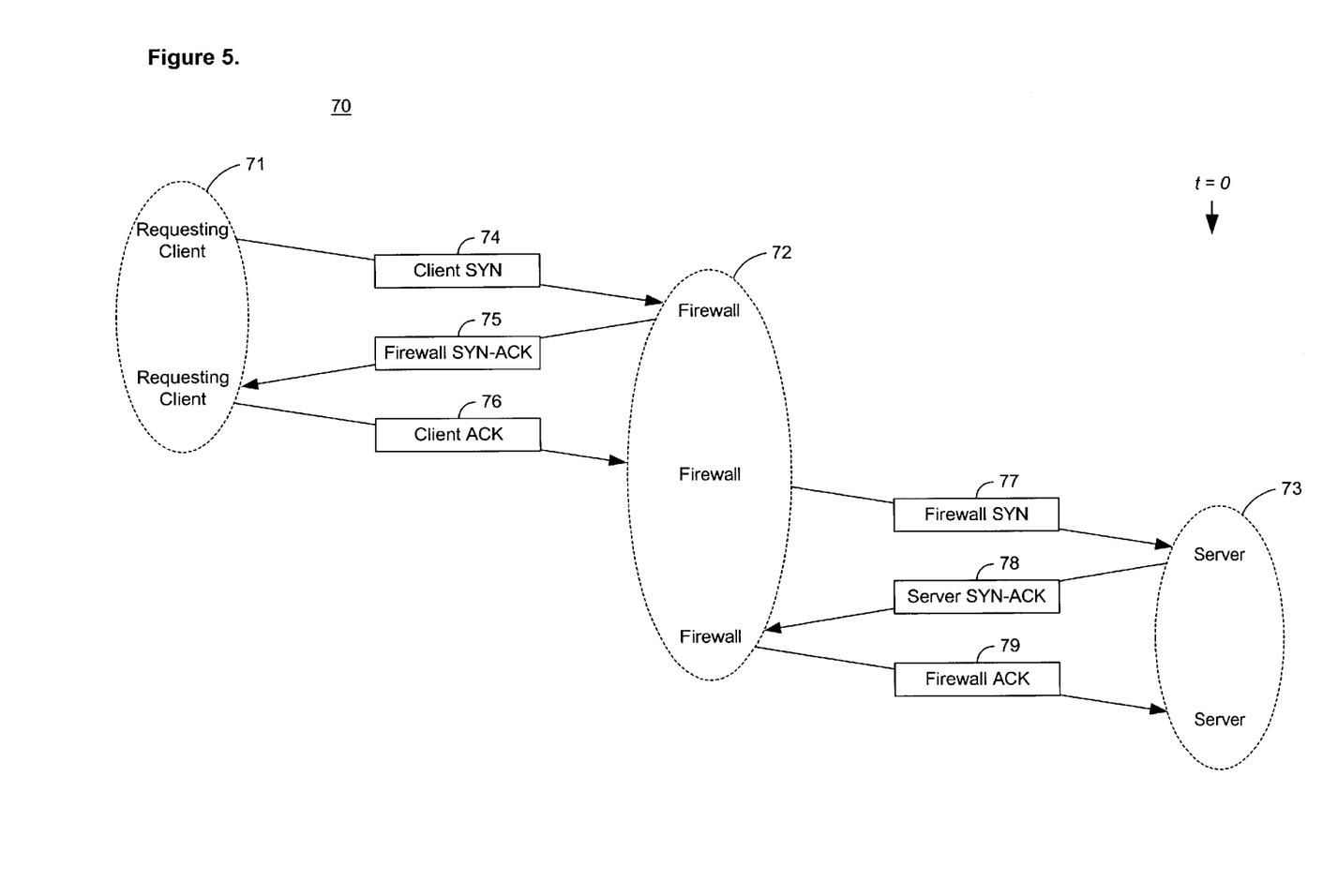
FIG. 5 is a timing diagram showing, by way of example, the authentication of an incoming TCP packet.

FIG. 5 is a timing diagram 70 showing, by way of example, the authentication of an incoming TCP packet. Briefly, a firewall 72 intercepts a session request from a requesting client 71 and only forwards the session request to a server 73 after checking the existence or validity of the requesting client 71. Non-existent or invalid session requests are discarded, thereby preventing state consumption leading up to a DoS attack.

Chronologically, a requesting "client" 71 sends a client SYN packet 74 to the server 73. However, the firewall 72 intercepts the client SYN packet 74 and generates a firewall SYN-ACK packet 75. No state on the firewall 72 is consumed. The firewall SYN-ACK packet 75 contains a pseudo acknowledgement number, preferably generated by taking the lowest 32-bits of a cryptographic checksum of the source address, destination address, source port number, destination port number, and sequence number contained in the IP header and the TCP header of the client SYN packet 74.

The firewall SYN-ACK packet 75 is addressed to the system at the source address specified in the TCP header of the client SYN packet 74. If a valid requesting client 71 sent the client SYN packet 74, the requesting client 71 will respond to the firewall SYN-ACK packet 75 by sending a client ACK packet 76.

However, if the client SYN packet 74 was spoofed, that is, sent with a fraudulent source address, two outcomes exist. First, if the spoofed source address is not in use by another system, no responding client ACK packet 76 will be generated and the original client SYN packet 74 will be ignored. Alternatively, if the spoofed source address is in use by another system but that system did not sent the original client SYN packet 74, that system will send a client reset (RST) packet. In either case, since the firewall 72 intercepted the spoofed client SYN packet 74 before reaching the server 73, no state is consumed or wasted, both on the server 73 and on the firewall 72.

Assuming the client SYN packet 74 originated from a valid requesting client 71, the firewall 72 will perform a three-way handshake with the server 73. First, the firewall 72 sends a firewall SYN packet 77 to the server 73 upon receiving back a client ACK packet 76. The firewall SYN packet 77 contains the original sequence number contained in the TCP header of the client SYN packet 74. In response, the server 73 returns a server SYN-ACK packet 78 containing an acknowledgement number. Finally, the firewall 72 completes the three-way handshake by responding with a firewall ACK packet 79. Note that the sequence numbers contained in all subsequent packets exchanged between the requesting client 71 and the server 73 will need to be translated to account for the offset of the firewall-generated pseudo sequence number.

Figure 6:
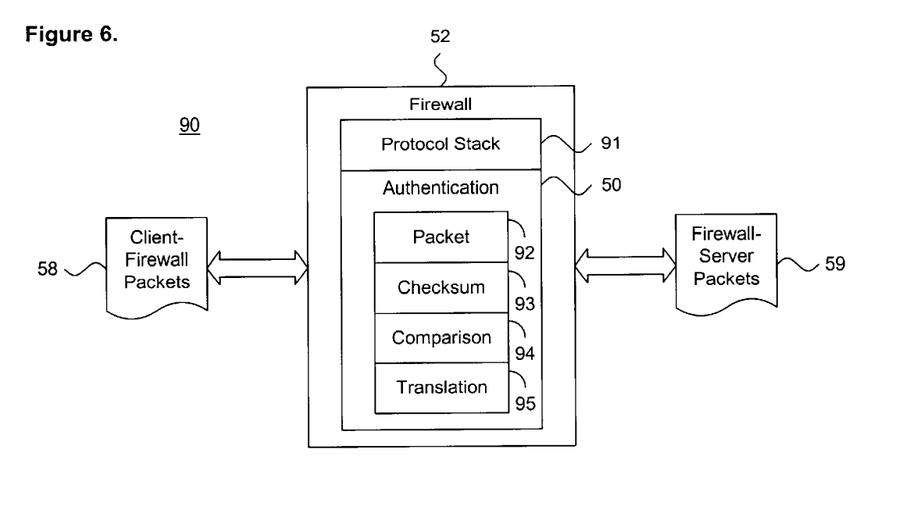
FIG. 6 is a block diagram showing the functional software modules of the system of FIG. 4.

FIG. 6 is a block diagram showing the functional software modules of the system 50 of FIG. 4. The authentication system 50 is incorporated into the firewall 52 and works in conjunction with a protocol stack 91. However, the authentication 50 could equally work as a stand-alone system or directly in conjunction with a server.

The system 50 consists of four main modules: packet 92, checksum 93, comparison 94, and translation 95. Each module is a computer program or module written as source code in a conventional programming language, such as the C programming language, and is presented for execution by the CPU as object or byte code, as is known in the art. The various implementations of the source code and object and byte codes can be held on a computer-readable storage medium or embodied on a transmission medium in a carrier wave. The system 50 operates in accordance with a sequence of process steps, as further described below beginning with reference to FIG. 7.

The packet module 92 performs packet housekeeping chores, including interfacing to the protocol stack 91, parsing header information for incoming packets and building headers for outgoing packets. The checksum module 93 generates a checksum, preferably cryptographic, based on information contained in the IP and TCP headers of incoming SYN packets. The comparison module 94 determines whether received ACK packets are valid or forged based on checksum information. Finally, the translation module 95 converts sequence numbers of non-SYN and non-ACK packets, that is, session packets, to adjust for the offset of the firewall pseudo acknowledgement number.

Figure 7:
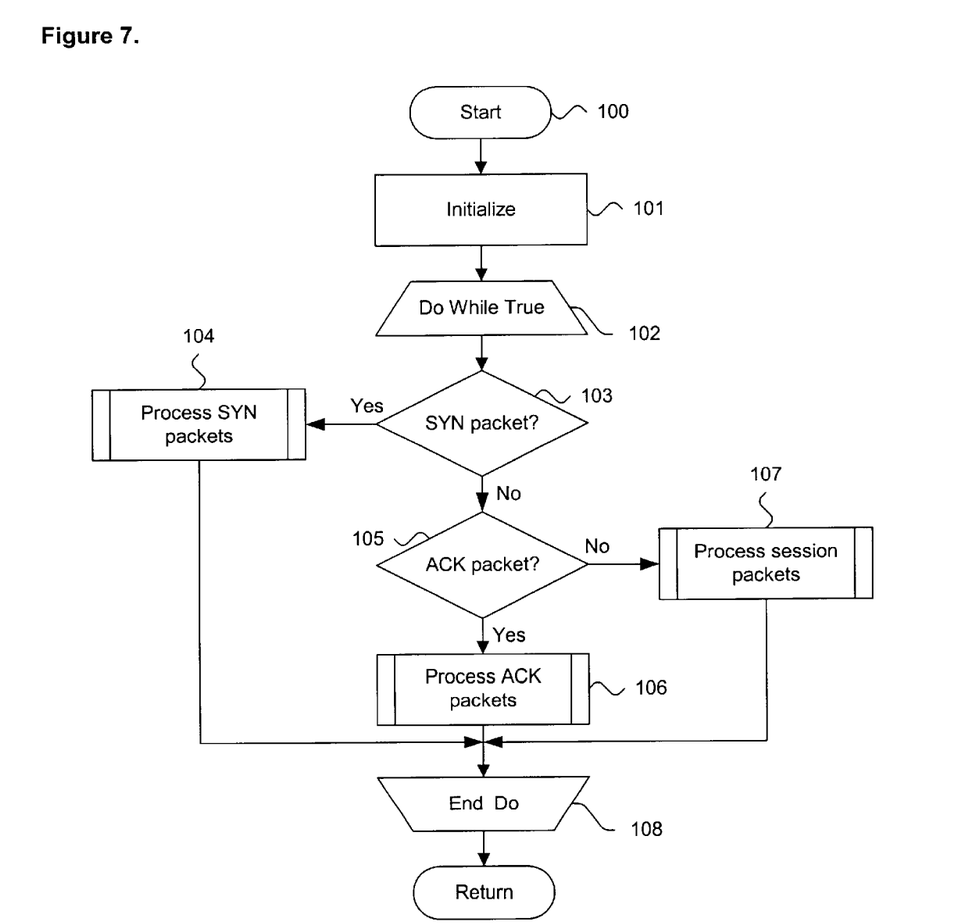
FIG. 7 is a flow diagram showing a method for preventing a spoofed denial of service attack in a networked computing environment in accordance with the present invention.

FIG. 7 is a flow diagram showing a method 100 for preventing a spoofed denial of service attack in a networked computing environment in accordance with the present invention. The method 100 operates in two phases. During the first phase, initialization (block 101), the protocol stack 91 (shown in FIG. 6) and authentication system 50 (shown in FIG. 4) are started and their associated data structures initialized.

During the second phase, operation (blocks 102–108), packets are iteratively processed as follows. If the incoming packet is a client SYN packet 74 (shown in FIG. 5) (block 103), a routine for processing SYN packets is called I(block 104), as further described below with reference to FIG. 8. If the incoming packet is a client ACK packet 76 (block 105), a routine for processing ACK packets is called (block 106), as farther described below with reference to FIG. 9. Otherwise, if the incoming packet is neither a client SYN packet nor a client ACK packet, a routine for processing session packets is called (block 107), as further described below with reference to FIG. 10. The iterative loop (blocks 102–108) is repeated for each new packet. The method 100 terminates upon the unloading of the authentication system 50 or upon shutdown of the firewall 52.

Figure 8:
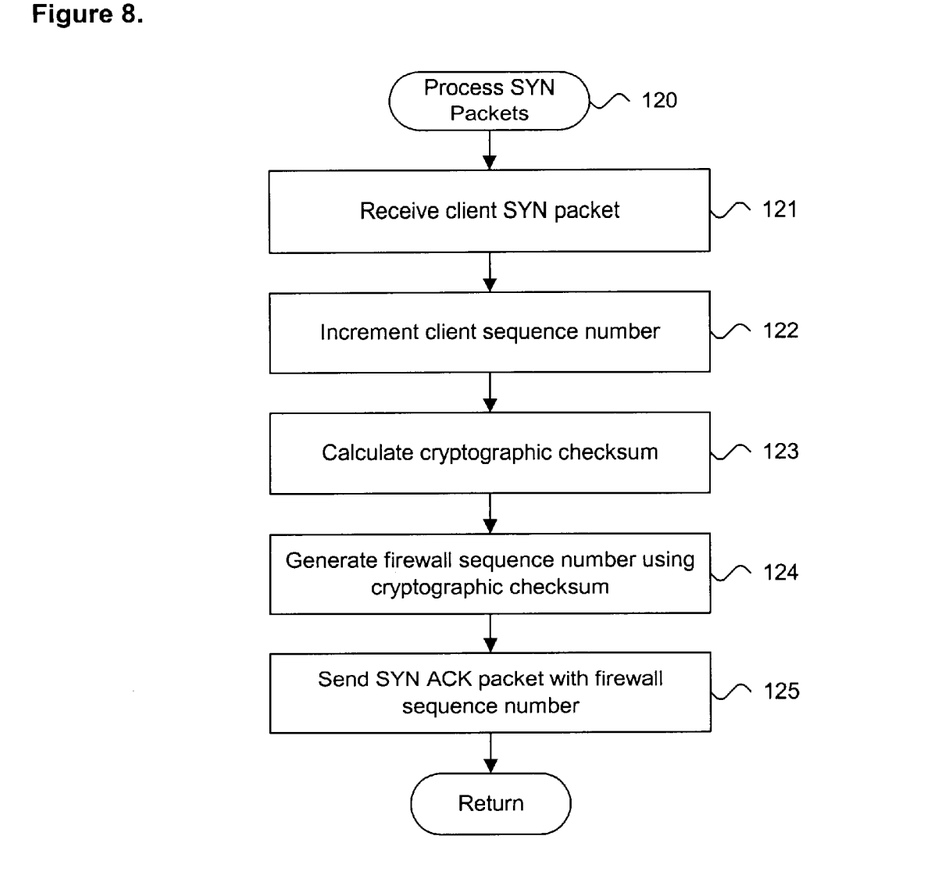
FIG. 8 is a flow diagram showing a routine for processing SYN packets for use in the method of FIG. 7.

FIG. 8 is a flow diagram showing a routine 120 for processing SYN packets 74 (shown in FIG. 5) for use in the method of FIG. 7. The purpose of this routine is to intercept TCP session request packets and generate a nearly non-forgeable response. Each client SYN packet 74 is received (block 121) before the session request is forwarded to the server. The sequence number contained in the TCP header of the client SYN packet 74 is incremented by one (block 122). A checksum, preferably cryptographic, is generated (block 123). In the described embodiment, the checksum is calculated using a secure cryptographic processing procedure, such as the Secure Hash Algorithm-1 (SHA-1), described in the Federal Information Processing Standards Publication, No. 180-1, or Message Authentication Code (MAC), described in the Federal Information Processing Standards Publication, No. 113. The cryptographic checksum is based on the source address (IP header), destination address (IP header), source port number (TCP header), destination port number (TCP header), and sequence number (TCP header), although more or fewer header fields, as well as other quantitative information, could be used in generating the checksum.

Next, a firewall sequence number is generated using the checksum (block 124). In the described embodiment, the lowest 32-bits of the cryptographic checksum are used. Finally, a firewall SYN-ACK packet 75 is sent addressed to the system located at the source address in the client SYN packet 74, after which the routine returns. Note that the foregoing routine 120 is alone sufficient to protect against a state consumption attack, as the server is sheltered from spoofed request packets and only client SYN packets 74 with valid source addresses are ultimately acknowledged.

Figure 9:
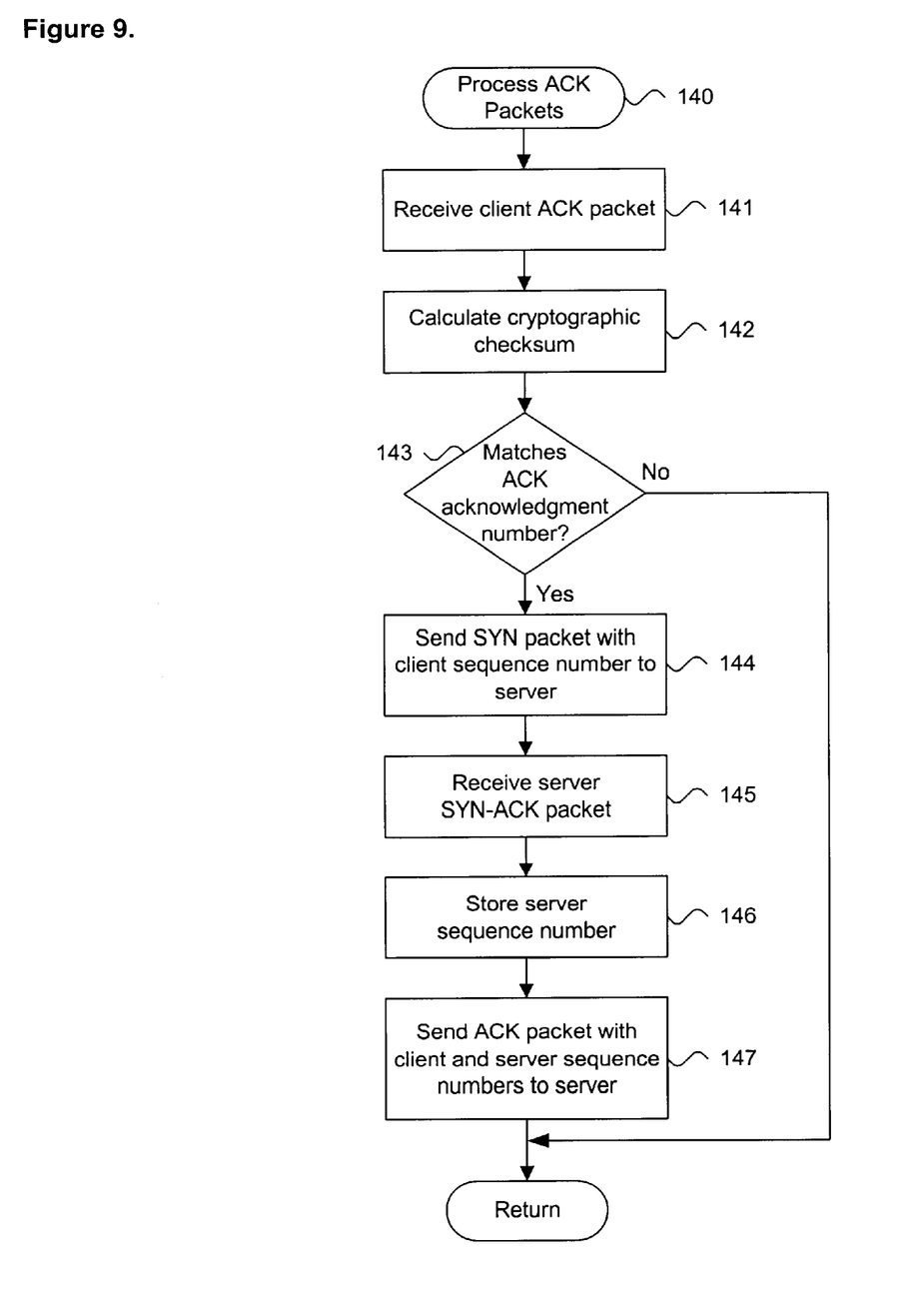
FIG. 9 is a flow diagram showing a routine for processing ACK packets for use in the method of FIG. 7.

FIG. 9 is a flow diagram showing a routine 140 for processing ACK packets 76 (shown in FIG. 5) for use in the method of FIG. 7. The purpose of this routine is to authenticate an acknowledgement reply from a possible client and, if authenticated, to complete a three-way handshake with the requested server. Each client ACK packet 76 is received (block 141) and a checksum, preferably cryptographic, is generated (block 142) using the same technique and information as used to generate the pseudo sequence number contained in the firewall SYN-ACK packet 75. The calculated checksum is compared to the acknowledgement number (minus one) contained in the client ACK packet 76 (block 143). If the checksum and acknowledgement number do not match (block 143), the client ACK packet 76 is discarded and the routine returns. Otherwise, the client is valid and a three-way handshake (blocks 144–147) is performed with the server.

First, a firewall SYN packet 77 is sent to the server using the sequence number contained in the TCP header of the original client SYN packet 74 (block 144). A server SYN-ACK packet 78 is received from the server (block 145) and the acknowledgement number contained in the TCP header is stored (block 146). The acknowledgement number needs to be stored to determine the offset between the pseudo acknowledgement number generated by the firewall 72 and exchanged with the receiving client 71 and the genuine acknowledgement number exchanged with the server 73. Finally, a firewall ACK packet 79 with the client and server sequence numbers is sent to the server (block 147) to complete the three-way handshake. The routine then returns.

Figure 10:
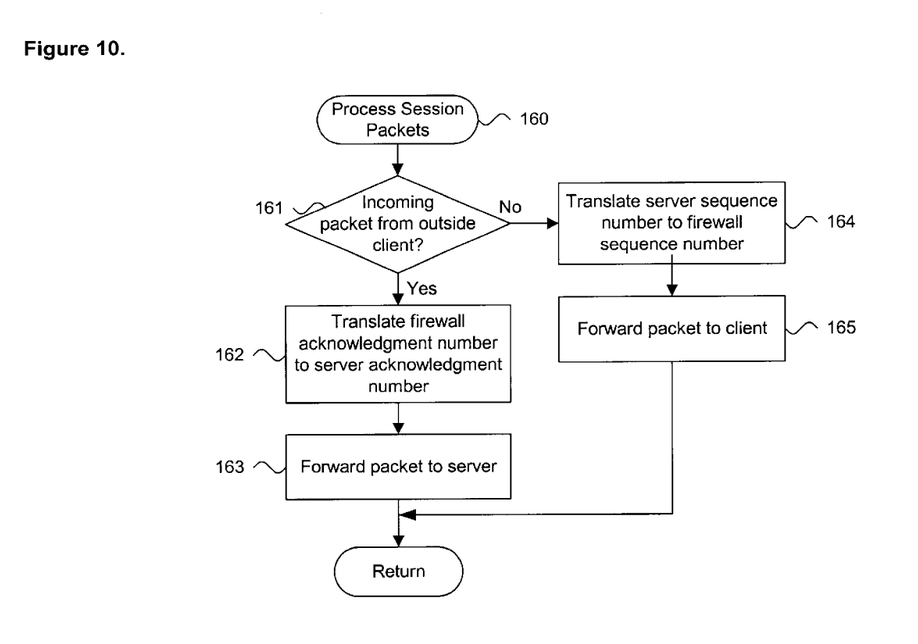
FIG. 10 is a flow diagram showing a routine for processing session packets for use in the method of FIG. 7.

FIG. 10 is a flow diagram showing a routine 160 for processing session packets for use in the method of FIG. 7. The purpose of this routine is to translate the sequence numbers contained in the TCP header of session packets transiting through the firewall 72. Thus, if the session packet is an incoming packet from an outside client, that is, originating from an authenticated client located outside the firewall 72, (block 161), the acknowledgement number in the TCP header is translated from a firewall acknowledgement number (which could also be called a "pseudo server acknowledgement number") to a server acknowledgement number (block 162). Sequence numbers and acknowledgement numbers are continuously incremented by the amount of data transferred, measured in bytes, as the TCP session progresses. By translating the firewall acknowledgement number into the server acknowledgement number, the firewall acknowledgement number plus any number i is translated into the server acknowledgement number plus i. The session packet is then forwarded to the server (block 163). Otherwise, if the session packet is an outgoing packet, that is, originating from the server (block 161), the sequence number in the TCP header is translated from a server sequence number to a firewall sequence number (block 164). By translating the server sequence number into the firewall sequence number, the server sequence number plus any number j is translated into the firewall sequence number plus j. The session packet is then forwarded to the server (block 165). The routine then returns.

Note that TCP sessions are terminated by a four-way handshake using finish (FIN) packets. These packets are processed by the routine 160 is the usual fashion and no special handling is necessary.

Thus, the present invention provides an approach to protecting a server from DoS attacks by intercepting and authenticating session requests. Only authenticated session requests are allowed to proceed to create a session between the server and a requesting client.

This approach functions in a TCP-based environment, as well as in any other session-oriented environment, in which a three-way handshake is performed. In addition, this approach functions entirely with TCP and does not rely on acknowledgement packets sent in other protocols. For instance, "ping" packets could be used with the Internet Control Message Protocol (ICMP).

However, ICMP headers do not include ports and, consequently, ICMP-based solutions will not work in those networked computing environments using dynamic network address translation.

While the invention has been particularly shown and described as referenced to the embodiments thereof, those skilled in the art will understand that the foregoing and other changes in form and detail may be made therein without departing from the spirit and scope of the invention.

What is claimed is:

1. A system for preventing a spoofed denial of service attack in a networked computing environment, comprising:
   a hierarchical protocol stack comprising a plurality of communicatively interfaced protocol layers with at least one session-oriented protocol layer and receiving a packet from the networked computing environment requesting a session with the session-oriented protocol layer, the request packet comprising headers containing a source address of uncertain trustworthiness, the hierarchical protocol stack receiving an acknowledgement packet from the networked computing environment comprising headers containing an acknowledgement number; and
   an authentication module acknowledging the request packet and validating the acknowledgement packet, comprising:
      a checksumming module calculating a checksum from information included in the request packet headers and calculating a validation checksum from information included in the acknowledgement packet headers;
      a packet module generating request acknowledgement packet comprising headers containing the checksum as a pseudo sequence number and the source address in the request packet headers as a destination address and sending the request acknowledgement packet into the networked computing environment; and
      a comparison module comparing the validation checksum to the acknowledgement number of the acknowledgement packet.

2. A system according to claim 1, further comprising:
   a firewall performing the request packet acknowledgement and the acknowledgement packet validation, the firewall functionally interposed between a server and the networked computing environment; and
   the authentication module performing a session handshaking sequence between the firewall and the server.

3. A system according to claim 2, further comprising:
   the authentication module forwarding a synchronize packet to the server, receiving a synchronize-acknowledgement packet from the server and forwarding an acknowledgement packet to the server.

4. A system according to claim 2, further comprising:
   a translation module translating sequence numbers and acknowledgement numbers on packets transiting through the firewall to and from the server in accordance with the acknowledgement number of the acknowledgement packet.

5. A system according to claim 1, wherein the calculated checksum is a cryptographic checksum.

6. A system according to claim 5, wherein the cryptographic checksum comprises at least one cryptographic processing procedure selected from the group comprising a secure hash algorithm-1 (SHA-1) and a message authorization code (MAC).

7. A system according to claim 1, wherein the information included in the headers of the request packet comprises a source address, a destination address, a source port number, a destination port number, and a sequence number.

8. A system according to claim 1, wherein the session-oriented protocol layer comprises the Transmission Control Protocol (TCP).

9. A method for preventing a spoofed denial of service attack in a networked computing environment, comprising:
   defining a hierarchical protocol stack comprising a plurality of communicatively interfaced protocol layers with at least one session-oriented protocol layer;
   receiving a packet from the networked computing environment requesting a session with the session-oriented protocol layer, the request packet comprising headers containing a source address of uncertain trustworthiness;
   acknowledging the request packet, comprising:
      calculating a checksum from information included in the request packet headers;
      generating a request acknowledgement packet comprising headers containing the checksum as a pseudo sequence number and the source address in the request packet headers as a destination address; and
      sending the request acknowledgement packet into the networked computing environment;
   receiving an acknowledgement packet from the networked computing environment comprising headers containing an acknowledgement number; and
   validating the acknowledgement packet, comprising:
      calculating a validation checksum from information included in the acknowledgement packet headers; and
      comparing the validation checksum to the acknowledgement number of the acknowledgement packet.

10. A method according to claim 9, further comprising:
   performing the request packet acknowledgement and the acknowledgement packet validation on a firewall functionally interposed between a server and the networked computing environment; and
   performing a session handshaking sequence between the firewall and the server.

11. A method according to claim 10, further comprising:
   forwarding a synchronize packet to the server;
   receiving a synchronize-acknowledgement packet from the server; and
   forwarding an acknowledgement packet to the server.

12. A method according to claim 10, further comprising:
   translating sequence numbers and acknowledgement numbers on packets transiting through the firewall to and from the server in accordance with the acknowledgement number of the acknowledgement packet.

13. A method according to claim 9, wherein the calculated checksum is a cryptographic checksum.

14. A method according to claim 13, wherein the cryptographic checksum comprises at least one cryptographic processing procedure selected from the group comprising a secure hash algorithm-1 (SHA-1) and a message authorization code (MAC).

15. A method according to claim 9, wherein the information included in the headers of the request packet comprises a source address, a destination address, a source port number, a destination port number, and a sequence number.

16. A method according to claim 9, wherein the session-oriented protocol layer comprises the Transmission Control Protocol (TCP).

17. A storage medium for preventing a spoofed denial of service attack in a networked computing environment, comprising:
   defining a hierarchical protocol stack comprising a plurality of communicatively interfaced protocol layers with at least one session-oriented protocol layer;
   receiving a packet from the networked computing environment requesting a session with the session-oriented protocol layer, the request packet comprising headers containing a source address of uncertain trustworthiness;
   acknowledging the request packet, comprising:
      calculating a checksum from information included in the request packet headers;
      generating a request acknowledgement packet comprising headers containing the checksum as a pseudo sequence number and the source address in the request packet headers as a destination address; and
      sending the request acknowledgement packet into the networked computing environment;
   receiving an acknowledgement packet from the networked computing environment comprising headers containing an acknowledgement number; and
   validating the acknowledgement packet, comprising:
      calculating a validation checksum from information included in the acknowledgement packet headers; and
      comparing the validation checksum to the acknowledgement number of the acknowledgement packet.

18. A storage medium according to claim 17, further comprising:
   performing the request packet acknowledgement and the acknowledgement packet validation on a firewall functionally interposed between a server and the networked computing environment; and
   performing a session handshaking sequence between the firewall and the server.

19. A storage medium according to claim 18, further comprising:
   forwarding a synchronize packet to the server;
   receiving a synchronize-acknowledgement packet from the server; and
   forwarding an acknowledgement packet to the server.

20. A storage medium according to claim 18, further comprising:
   translating sequence numbers and acknowledgement numbers on packets transiting through the firewall to and from the server in accordance with the acknowledgement number of the acknowledgement packet.

* * * * *